United States Patent
Slattery

(10) Patent No.: US 8,407,681 B2
(45) Date of Patent: Mar. 26, 2013

(54) SYSTEM AND METHOD FOR CHANGING VARIABLES AT RUNTIME

(75) Inventor: Edward Slattery, Chandlers Ford (GB)

(73) Assignee: International Business Machines Corporation, Armonk, NY (US)

(*) Notice: Subject to any disclaimer, the term of this patent is extended or adjusted under 35 U.S.C. 154(b) by 1342 days.

(21) Appl. No.: 12/126,206

(22) Filed: May 23, 2008

(65) Prior Publication Data

US 2009/0293050 A1 Nov. 26, 2009

(51) Int. Cl.
G06F 9/44 (2006.01)

(52) U.S. Cl. .................... 717/158; 717/141; 717/151

(58) Field of Classification Search .................. 717/158
See application file for complete search history.

(56) References Cited

U.S. PATENT DOCUMENTS

| | | | |
|---|---|---|---|
| 6,035,123 A * | 3/2000 | Razdan et al. | 717/155 |
| 6,463,582 B1 * | 10/2002 | Lethin et al. | 717/158 |
| 6,633,557 B1 * | 10/2003 | Niegel et al. | 370/342 |
| 6,658,492 B1 * | 12/2003 | Kawahara et al. | 719/332 |
| 6,862,729 B1 | 3/2005 | Kuch et al. | |
| 7,032,215 B2 * | 4/2006 | Harrison et al. | 717/140 |
| 7,133,993 B1 * | 11/2006 | Jackson et al. | 711/172 |
| 7,325,230 B2 * | 1/2008 | Uchida | 717/140 |
| 7,415,491 B2 * | 8/2008 | Sekiguchi | 1/1 |
| 7,610,580 B2 * | 10/2009 | Lagergren | 717/153 |
| RE41,959 E * | 11/2010 | Suzuki et al. | 712/210 |
| 7,933,941 B2 * | 4/2011 | Matsuzaki | 708/204 |
| 7,949,848 B2 * | 5/2011 | Wilkinson | 711/171 |
| 7,978,113 B2 * | 7/2011 | Kulchycki | 341/155 |
| 8,108,649 B2 * | 1/2012 | Inoue et al. | 711/171 |
| 2003/0028739 A1 | 2/2003 | Li et al. | |
| 2003/0061580 A1 * | 3/2003 | Greaves | 716/4 |
| 2003/0121010 A1 * | 6/2003 | Aubury | 716/4 |
| 2005/0246697 A1 | 11/2005 | Hsieh et al. | |
| 2006/0212862 A1 | 9/2006 | Nesbitt et al. | |
| 2007/0180016 A1 * | 8/2007 | Gemmeke et al. | 708/700 |
| 2008/0098336 A1 * | 4/2008 | Tanimoto et al. | 716/3 |
| 2008/0147696 A1 * | 6/2008 | Ishizaki | 707/101 |
| 2008/0222198 A1 * | 9/2008 | Wilkinson | 707/103 R |

OTHER PUBLICATIONS

A. Inoue, H. Tomiyama, F. N. Eko, H. Kanbara, and H. Yasuura. A programming language for processor based embedded systems. In Proc. of APCHDL, 1998.*

R. Barik and V. Sarkar. Enhanced Bitwidth-Aware Register Allocation. In Proceedings of the 2006 International Conference on Compiler Construction (CC 2006), Mar. 2006.).*

(Continued)

Primary Examiner — Wei Zhen
Assistant Examiner — Matthew Brophy
(74) Attorney, Agent, or Firm — Schmeiser, Olsen & Watts; Richard Kotulak

(57) ABSTRACT

A system and associated method for changing the initial size of a variable where intermediate code contains a static method class which in turn contains the initial size of variable. Comparing a statistic with the initial size of the variable, the statistic being derived from all current instances of the variable contained in located in dynamic memory, the comparing being performed in response to an event having occurred. Then modifying the initial size of the variable located in the intermediate code. The modification being in such a way as to change the initial size of variable in dependence of the statistic and all current instances of the variable located in the dynamic memory. Finally, repeating the comparing and changing steps for all variables contained in the dynamic memory.

20 Claims, 3 Drawing Sheets

OTHER PUBLICATIONS

Mark Stephenson, Jonathan Babb, and Saman Amarasinghe. 2000. Bidwidth analysis with application to silicon compilation. SIGPLAN Not. 35, 5 (May 2000), 108-120. DOI=10.1145/358438.349317 http://doi.acm.org/10.1145/358438.349317.*

Sriraman Tallam and Rajiv Gupta. 2003. Bitwidth aware global register allocation. SIGPLAN Not. 38, 1 (Jan. 2003), 85-96. DOI=10.1145/640128.604139 http://doi.acm.org/10.1145/640128.604139.*

Youtao Zhang and Rajiv Gupta. 2006. Compressing heap data for improved memory performance: Research Articles. Softw. Pract. Exper. 36, 10 (Aug. 2006), 1081-1111. DOI=10.1002/spe.v36:10 http://dx.doi.org/10.1002/spe.v36:10.*

* cited by examiner

SYSTEM AND METHOD FOR CHANGING VARIABLES AT RUNTIME

BACKGROUND OF THE INVENTION

The present invention relates generally to application variables. Specifically, the present invention optimizes a variable's size at runtime according to previous instances of said variable.

During application design it is difficult to select the optimum variable type and size for use at runtime. An application may call for different variable types and sizes based on each end user's specific requirements.

Initializing a variable's size too large may waste valuable memory space while initializing a variable's size too small may cause increased reallocation in the future. Additionally, selecting a sub-optimum variable type may further degrade the efficiency in which a given application operates.

Conventionally custom software was designed specific to an end user's needs. However, development costs associated with custom software usually far exceeded the benefit gained, especially by small or new business entities.

SUMMARY OF THE INVENTION

A method for changing the initial size of a variable[y], where intermediate code contains a static method class[x] which in turn contains the initial size of variable[y], where a virtual machine interprets the intermediate code at runtime, where x indexes static method classes from 1 to N, where y indexes variables from 1 to M, the method comprising:

comparing a statistic with the initial size of variable[y], the statistic being derived from all current instances of the variable[y] contained in annotated method class[x], the annotated method class[x] being located in dynamic memory, said comparing being performed in response to an event having occurred;

after said comparing, modifying the initial size of the variable[y] located in the static method class[x] in the intermediate code in such a way as to change the initial size of variable [y] in dependence of all current instances of the variable[y] and the statistic for subsequent initializations of the static method class[x] by the virtual machine; and repeating said comparing and said changing for all [x,y] combinations of x=1, 2, . . . , N and y=1, 2, . . . , M.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Embodiments of the preset invention primarily relate to optimizing a variable's size within a bytecode-compiled system. In a bytecode-compiled system, an application's source code is first compiled into an intermediate form called bytecode. While bytecode is not interpreted directly by a computer, it is interpreted by a virtual machine. The virtual machine's purpose is to provide a platform-independent programming environment which abstracts details of the underlying hardware or operating system and allows an application to execute the same way regardless of the platform.

Conventionally, the virtual machine interprets instructions contained in the bytecode at runtime. For example, Java® and Smalltalk® code is typically stored in bytecode format and compiled execution. In the foregoing scenario each class contained in the bytecode is defined hereinafter as a static method class. Each class initialized by the virtual machine is hereinafter defined as an annotated method class. The virtual machine initializes and manipulates annotated method classes in dynamically allocated memory (e.g. the heap).

Embodiments of the present invention utilize this programming environment to determine the optimum size for each variable contained in static method classes stored in the bytecode by comparing variables contained in dynamically allocated memory.

Throughout the detailed specification, drawings, and subsequent claims, [x] indexes method classes for x=1, 2, . . . , N. Furthermore, [y] indexes variables for y=1, 2, . . . M, which reside within a given method class.

Figure 1:
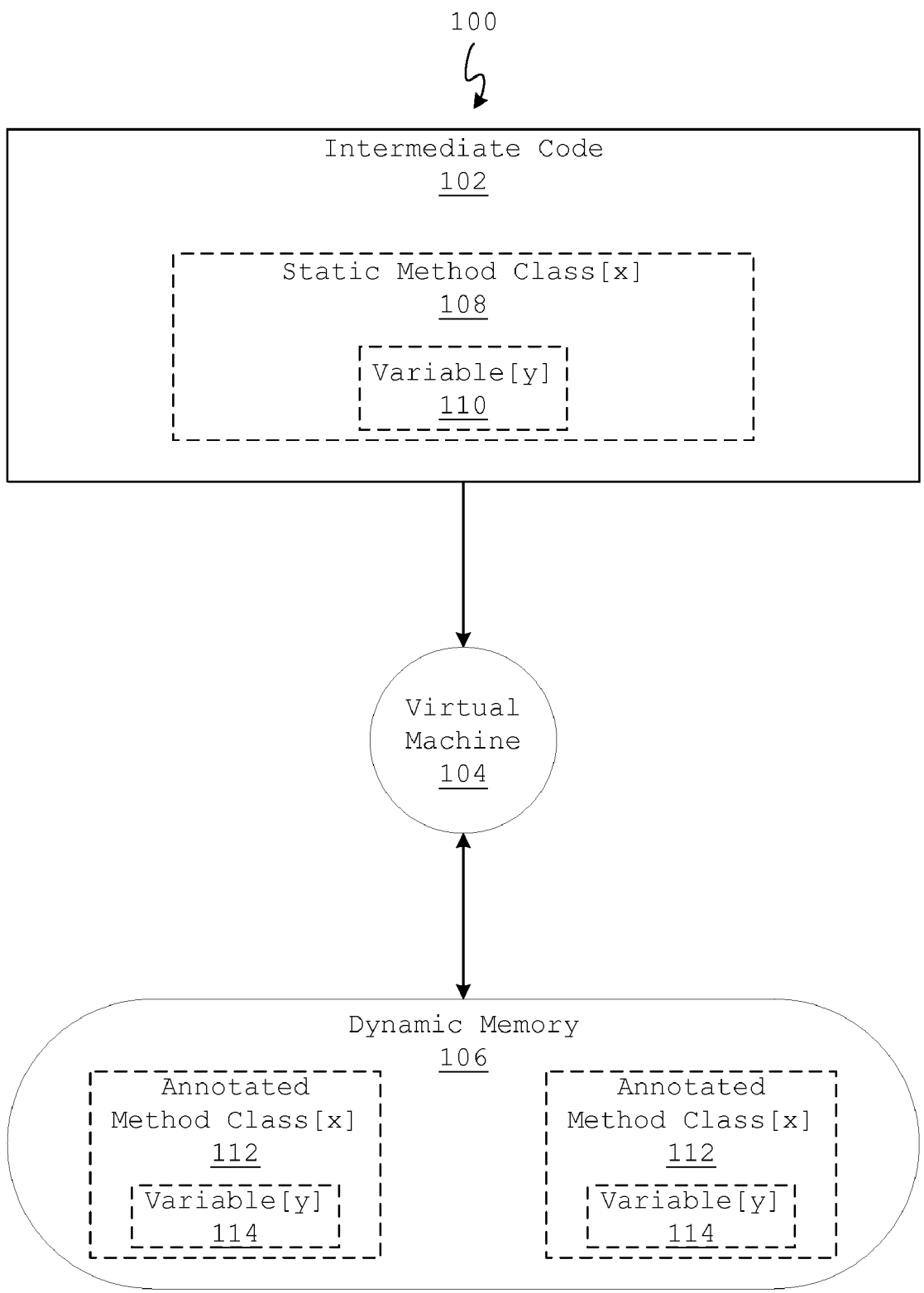
FIG. 1 illustrates an environment in which a method for optimizing variables at runtime may be implemented, in accordance with embodiments of the present invention.

FIG. 1 illustrates an environment 100 in which a method 200 (see FIG. 2, infra) for optimizing variables at runtime may be implemented, in accordance with embodiments of the present invention.

The environment 100 comprises intermediate code 102, a virtual machine 104, and dynamic memory 106. The intermediate code 102 (e.g. bytecode) comprises static method class[x] 108. Additionally, static method class[x] 108 comprises variable[y] 110.

The dynamic memory 106 (e.g. the heap) may comprise multiple instances of annotated method class[x] 112. Additionally, the annotated method class[x] 112 further comprises instances of variable[y] 114. In FIG. 1, the dynamic memory 106 contains two (2) instances of annotated method class[x] 112 and thus two (2) instances of variable[y] 114.

Conventionally, the virtual machine 104 manages applications running in the environment 100. When an instance of method class[x] is called for (by an end user, another application, another computer, etc.) the virtual machine 104 creates an annotated method class[x] 112 in the dynamic memory 106, the annotated method class[x] 112 having the initial values as contained in the static method class[x] 108.

For example, variable[y] 110 in the static method class[x] 108 has an initial size of 100 bytes. When the virtual machine 104 creates an annotated method class[x] in the dynamic memory 106, the variable[y] 114 contained in the annotated method class[x] 112 will have an initial size of 100 bytes. As an end user utilizes the annotated method class[x] 112 the variable[y] 114 contained therein increases from an initial size of 100 bytes to a current size of 5,000 bytes.

Eventually an event occurs thereafter the present invention begins. The event may be, inter alia, the elapse of one hour, the elapse of one day, the occurrence of a garbage collection, the elapse of a predetermined amount of time as identified by an end user, a timeout in the virtual machine 104 processing, etc.

After the occurrence of the event, the present invention searches the dynamic memory 106 finding the end user's instance of annotated method class[x] 112 which contains variable[y] 114 with a size of 5,000 bytes. The present invention then compares the size of variable[y] 114 (5,000 bytes) with that of the variable[y] 110 (100 bytes) in the intermediate code 102.

Since variable[y] 114 in the dynamic memory 106 is fifty times (50×) larger than the variable[y] 110 in the intermediate code 102, the present invention would optimize the size of variable[y] 110 in the intermediate code 102 so when the virtual machine 104 initiates another annotated method class [x] 112, the size of variable[y] 114 contained therein would more closely match the end user's needs.

Similarly, if variable[y] 110 in the intermediate code 102 had an initial size of 2,000 bytes while variable[y] 114 in the dynamic memory 106 only used 50 bytes, the present invention would optimize variable[y] in the intermediate code 102 so as not to waste the dynamic memory 106 since it would be clear that end users did not need 2,000 bytes for variable[y] 114.

Figure 2:
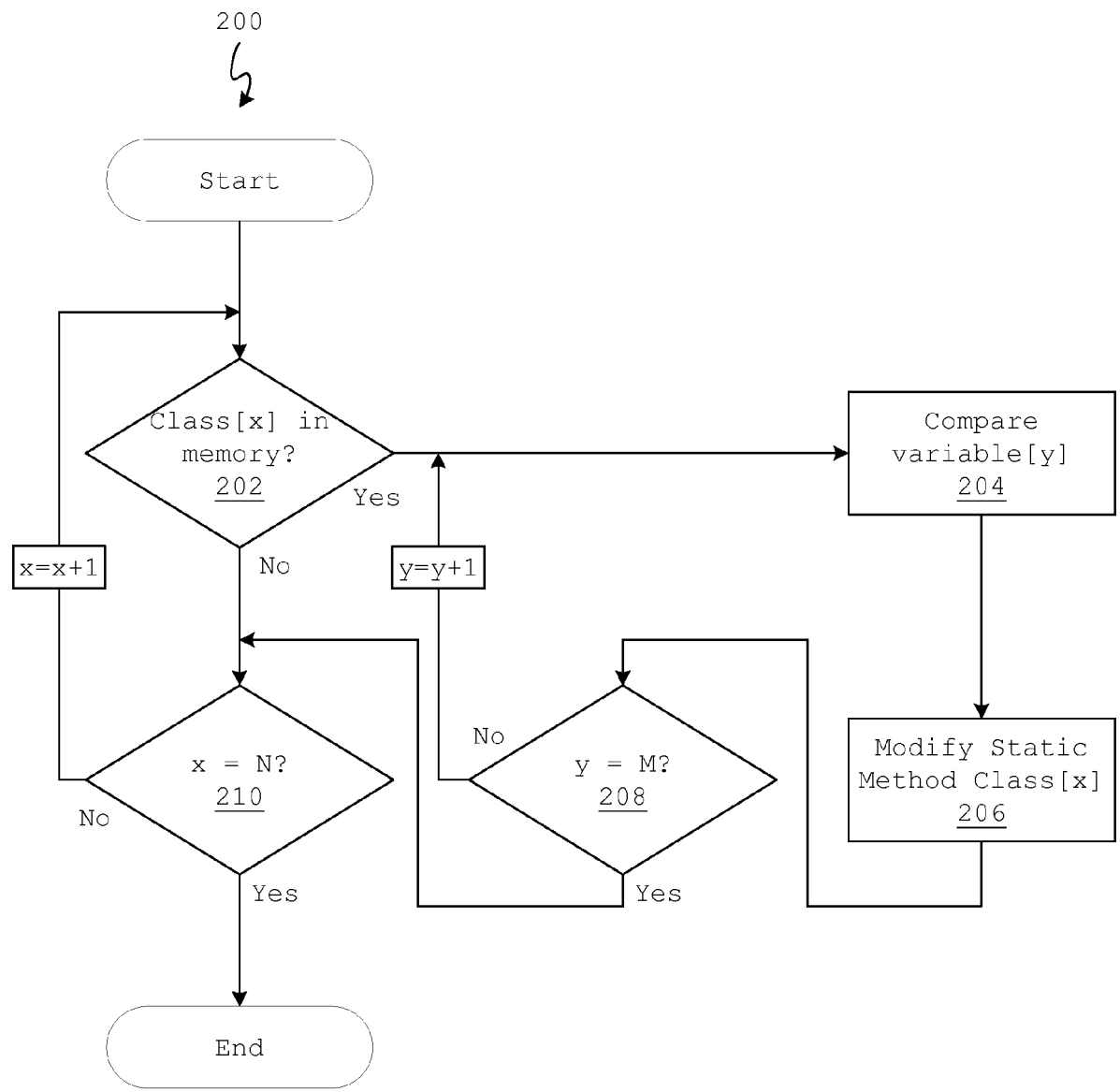
FIG. 2 illustrates a method for optimizing variables at runtime, in accordance with embodiments of the present invention.

FIG. 2 illustrates a method 200 for optimizing variables at runtime, in accordance with embodiments of the present invention. The method 200 begins with step 202 which determines if there are any instances of annotated method class[x] located in dynamic memory 106.

Step 202 determines whether any instances of annotated method class[x] located in dynamic memory 106. The determination in step 202 is made by searching the dynamic memory 106 for annotated method class[x]. If at least one instance of annotated method class[x] appears in dynamic memory 106, the method 200 continues with step 204 which compares variable[y] 114 located in the dynamic memory with variable[y] 110 located in the intermediate code 102. If no instances of annotated method class[x] are found in the dynamic memory 106, the method 200 continues with step 210 which determines if additional classes can be optimized.

Step 204 compares variable[y] 114 located in the dynamic memory with variable[y] 110 located in the intermediate code 102.

In one embodiment of the present invention step 204 determines a statistic as the mean size of all instances of dynamic memory 106 variable[y] 114.

In an alternative embodiment of the present invention step 204 determines a statistic as the median size of all instances of dynamic memory 106 variable[y] 114.

In an alternative embodiment of the present invention step 204 determines a statistic as the mode size of all instances of dynamic memory 106 variable[y] 114.

In an alternative embodiment of the present invention step 204 determines a statistic as the minimum size of all instances of dynamic memory 106 variable[y] 114.

In an alternative embodiment of the present invention step 204 determines a statistic as the maximum size of all instances of dynamic memory 106 variable[y] 114.

Regardless of the embodiment of the present invention, step 204 thereinafter compares the determined statistic to the size of intermediate code 102 variable[y] 110.

In one embodiment of the present invention, step 204 calculates a value equal to one half the sum of the statistic and variable [y] 110

$$\left(\text{value} = \frac{\text{statistic} + \text{variable}[y]110}{2}\right).$$

For example, if the determined statistic equals 5,000 and the size of variable [y]110 in the intermediate code 102 is equal to 100, the value calculated by step 204 would be 2550. The calculation of the value also takes into account the situation where the variable [y]110 is larger than the statistic. For example, if the determined statistic equals 100 and the size of variable [y]110 in the intermediate code 102 is equal to 5000, the value calculated by step 204 would be 2550.

In an alternative embodiment of the present invention, step 204 calculates a value equal to one half the sum of the statistic and variable[y] 110

$$\left(\text{value} = \frac{\text{statistic} + \text{variable}[y]110}{3}\right).$$

In an alternative embodiment of the present invention, step 204 calculates a value equal to one half the sum of the statistic and variable[y] 110

$$\left(\text{value} = \frac{\text{statistic} + \text{variable}[y]110}{1.5}\right).$$

After completion of step 204, the method 200 continues with step 206 which modifies the static method class[x] 108.

Step 206 modifies static method class [x] 108 located in the intermediate code 102. Specifically, step 206 modifies the variable [y] 110 located in static method [x] 108 which is located in the intermediate code 102. Step 206 receives the value calculated by step 204 and changes the initial size of variable [y] 110 to be equal to the value. For example, if step 204 calculates the value to be 225, step 206 modifies the variable [y] 110 so that the initial size of variable [y] 110 is equal to 225. After completion of step 206, the method 200 continues with step 208 which determines if index [y] is equal to M.

Step 208 determines if index [y] is equal to M (the total number of variables in a given class[x]). If index [y] is less than M, step 208 increases index [y] by one (y=y+1) and the method 200 returns to step 204 for a comparison of variable [y+1]. If index [y] does equal M, then the method 200 continues to step 210 which determines if index [x] is equal to N.

Step 210 determines if index [x] is equal to N (the total number of static classes in the intermediate code 102). If index [x] is less than N, step 210 increases index [x] by one (x=x+1) and the method 200 returns to step 202 to determine if annotate method class[x+1] appears in the dynamic memory 106. If index [x] does equal N, the method 200 ends.

Figure 3:
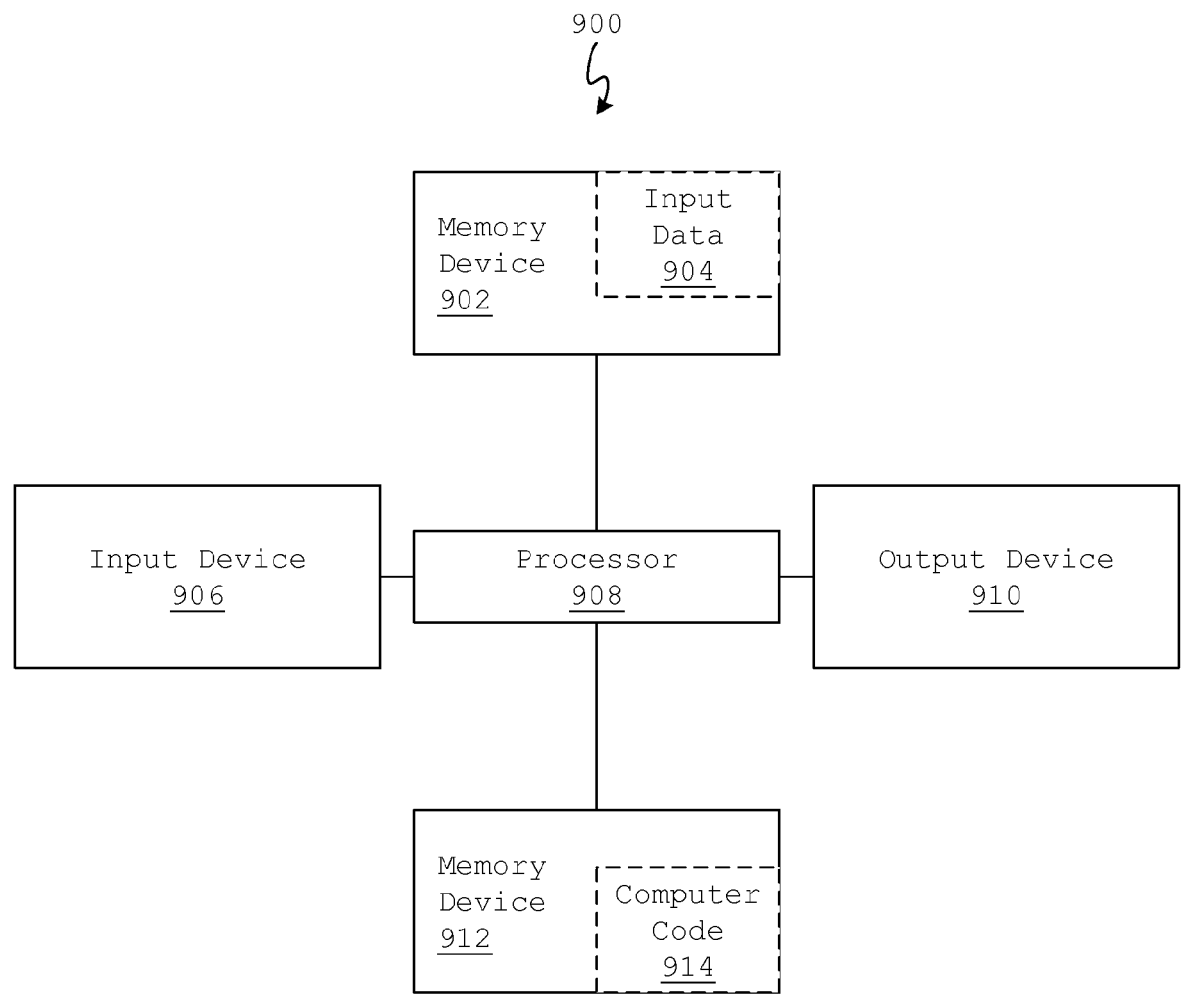
FIG. 3 illustrates a computer system which may facilitate a method for optimizing variables at runtime, in accordance with embodiments of the present invention.

FIG. 3 illustrates a computer system 900 which may facilitate a method for optimizing variables at runtime, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for optimizing variable size during application runtime according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 3) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for optimizing variable size during application runtime. Thus, the present invention discloses a process for supporting computer infrastructure, comprising integrating, hosting, maintaining and deploying computer-readable code into a computing system (e.g., computing system 900), wherein the code in combination with the computing system is capable of performing a method for optimizing variable size during application runtime.

In another embodiment, the invention provides a business method that performs the process steps of the invention on a subscription, advertising and/or fee basis. That is, a service provider, such as a Solution Integrator, can offer to create, maintain, support, etc. a process for authenticating an end user. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 3 shows the computer system 900 as a particular configuration of hardware and software, any configuration of hardware and software, as would be known to a person of ordinary skill in the art, may be utilized for the purposes stated supra in conjunction with the particular computer system 900 of FIG. 3. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for changing the initial size of a variable[y], where intermediate code contains a static method class[x] which in turn contains the initial size of variable[y], where a virtual machine interprets the intermediate code at runtime, said method comprising:

said virtual machine creating, by a processor of a computer system, a plurality of instances of method class[x] in dynamic memory, each created instances in dynamic memory including the variable[y] having the initial size;

said processor changing, during execution of the interpreted intermediate code, the size of the variable[y] for at least one instance of the plurality of instances of method class[x] in dynamic memory to a second size different from the initial size;

in response to an occurrence of an initiating event, said processor searching the dynamic memory for said instances of method class[x] currently stored in the dynamic memory, said searching comprising finding the plurality of instances of method class[x] stored in dynamic memory;

after said finding the plurality of instances of method class[x] stored in dynamic memory, said processor calculating a statistic, wherein the statistic is a function of a size of all instances of the variable[y] of the plurality of instances of method class[x] in the dynamic memory;

after said calculating the statistic, said processor comparing the statistic with the initial size of variable[y] in the intermediate code; and after said comparing, said processor replacing the initial size of the variable[y] located in the static method class[x] in the intermediate code with a replacement size that depends on both the initial size and the statistic, for subsequent initializations of the static method class[x] by the virtual machine.

2. The method of claim 1, wherein the statistic is selected from the group consisting of: a mean size of all instances of the variable[y] located in the dynamic memory, a median size of all instances of the variable[y] located in the dynamic memory, a mode size of all instances of the variable[y] located in the dynamic memory, a minimum size of all instances of the variable[y] located in the dynamic memory, and a maximum size of all instances of the variable[y] located in the dynamic memory.

3. The method of claim 1, wherein the replacement size is S/1.5 such that S is a sum of the initial size and the statistic.

4. The method of claim 1, wherein the replacement size is S/2 such that S is a sum of the initial size and the statistic.

5. The method of claim 1, wherein the replacement size is S/3 such that S is a sum of the initial size and the statistic.

6. A computer program product, comprising a computer-readable memory device having a computer-readable program code stored therein, said computer-readable program code containing instructions that when executed by a processor of a computer system implement a method for changing the initial size of a variable[y], where intermediate code contains a static method class[x] which in turn contains the initial size of variable[y], where a virtual machine interprets the intermediate code at runtime, said method comprising:

said virtual machine creating, by a processor of a computer system, a plurality of instances of method class[x] in dynamic memory, each created instances in dynamic memory including the variable[y] having the initial size;

said processor changing, during execution of the interpreted intermediate code, the size of the variable[y] for at least one instance of the plurality of instances of method class[x] in dynamic memory to a second size different from the initial size;

in response to an occurrence of an initiating event, said processor searching the dynamic memory for said instances of method class[x] currently stored in the dynamic memory, said searching comprising finding the plurality of instances of method class[x] stored in the dynamic memory;

after said finding the plurality of instances of method class [x] stored in dynamic memory, said processor calculating a statistic, wherein the statistic is a function of a size of all instances of the variable[y] of the plurality of instances of method class[x] in the dynamic memory;

after said calculating the statistic, said processor comparing the statistic with the initial size of variable[y] in the intermediate code; and after said comparing, said processor replacing the initial size of the variable[y] located in the static method class [x] in the intermediate code with a replacement size that depends on both the initial size and the statistic, for subsequent initializations of the static method class[x] by the virtual machine.

7. The computer program product of claim 6, wherein the statistic is selected from the group consisting of: a mean size of all instances of the variable[y] located in the dynamic memory, a median size of all instances of the variable[y] located in the dynamic memory, a mode size of all instances of the variable[y] located in the dynamic memory, a minimum size of all instances of the variable[y] located in the dynamic memory, and a maximum size of all instances of the variable [y] located in the dynamic memory.

8. The computer program product of claim 6, wherein the replacement size is S/1.5 such that S is a sum of the initial size and the statistic.

9. The computer program product of claim 6, wherein the replacement size is S/2 such that S is a sum of the initial size and the statistic.

10. The computer program product of claim 6, wherein the replacement size is S/3 such that S is a sum of the initial size and the statistic.

11. A computer system comprising a processor coupled to a computer-readable memory unit, said memory unit comprising a software application, said software application comprising instruction that when executed by said processor, implement a method for changing the initial size of a variable [y], where intermediate code contains a static method class[x] which in turn contains the initial size of variable[y], where a virtual machine interprets the intermediate code at runtime, said method comprising:

said virtual machine creating, by a processor of a computer system, a plurality of instances of method class[x] in dynamic memory, each created instances in dynamic memory including the variable[y] having the initial size;

said processor changing, during execution of the interpreted intermediate code, the size of the variable[y] for at least one instance of the plurality of instances of method class[x] in dynamic memory to a second size different from the initial size;

in response to an occurrence of an initiating event, said processor searching the dynamic memory for said instances of method class[x] currently stored in the dynamic memory, said searching comprising finding the plurality of instances of method class[x] stored in the dynamic memory;

after said finding the plurality of instances of method class [x] stored in dynamic memory, said processor calculating a statistic, wherein the statistic is a function of a size of all instances of the variable[y] of the plurality of instances of method class[x] in the dynamic memory;

after said calculating the statistic, said processor comparing the statistic with the initial size of variable[y] in the intermediate code; and after said comparing, said processor replacing the initial size of the variable[y] located in the static method class [x] in the intermediate code with a replacement size that depends on both the initial size and the statistic, for subsequent initializations of the static method class[x] by the virtual machine.

12. The computer system of claim 11, wherein the statistic is selected from the group consisting of: a mean size of all instances of the variable[y] located in the dynamic memory, a median size of all instances of the variable[y] located in the dynamic memory, a mode size of all instances of the variable [y] located in the dynamic memory, a minimum size of all instances of the variable[y] located in the dynamic memory, and a maximum size of all instances of the variable[y] located in the dynamic memory.

13. The computer system of claim 11, wherein the replacement size is S/1.5 such that S is a sum of the initial size and the statistic.

14. The computer system of claim 11, wherein the replacement size is S/2 such that S is a sum of the initial size and the statistic.

15. The computer system of claim 11, wherein the replacement size is S/3 such that S is a sum of the initial size and the statistic.

16. A process for supporting computer infrastructure, said process comprising providing at least one support service for at least one of creating, integrating, hosting, maintaining, and deploying computer-readable code in a computer system, wherein said code in combination with the computer system is capable of implementing a method for changing the initial size of a variable[y], where intermediate code contains a static method class[x] which in turn contains the initial size of variable[y], where a virtual machine interprets the intermediate code at runtime, said method comprising:

said virtual machine creating, by a processor of a computer system, a plurality of instances of method class[x] in dynamic memory, each created instances in dynamic memory including the variable[y] having the initial size;

said processor changing, during execution of the interpreted intermediate code, the size of the variable[y] for at least one instance of the plurality of instances of method class[x] in dynamic memory to a second size different from the initial size;

in response to an occurrence of an initiating event, said processor searching the dynamic memory for said instances of method class[x] currently stored in the dynamic memory, said searching comprising finding the plurality of instances of method class[x] stored in the dynamic memory;

after said finding the plurality of instances of method class [x] stored in dynamic memory, said processor calculating a statistic, wherein the statistic is a function of a size of all instances of the variable[y] of the plurality of instances of method class[x] in the dynamic memory;

after said calculating the statistic, said processor comparing the statistic with the initial size of variable[y] in the intermediate code; and after said comparing, said processor replacing the initial size of the variable[y] located in the static method class [x] in the intermediate code with a replacement size that depends on both the initial size and the statistic, for subsequent initializations of the static method class[x] by the virtual machine.

17. The process for supporting computer infrastructure of claim 16, wherein the statistic is selected from the group consisting of: a mean size of all instances of the variable[y] located in the dynamic memory, a median size of all instances of the variable[y] located in the dynamic memory, a mode size of all instances of the variable[y] located in the dynamic memory, a minimum size of all instances of the variable[y] located in the dynamic memory, and a maximum size of all instances of the variable[y] located in the dynamic memory.

18. The process for supporting computer infrastructure of claim 16, wherein the replacement size is S/1.5 such that S is a sum of the initial size and the statistic.

19. The process for supporting computer infrastructure of claim 16, wherein the replacement size is S/2 such that S is a sum of the initial size and the statistic.

20. The process for supporting computer infrastructure of claim 16, wherein the replacement size is S/3 such that S is a sum of the initial size and the statistic.

* * * * *